W. V. JOHNSON.
MINE CAR WHEEL.
APPLICATION FILED NOV. 22, 1915.
1,183,984.
Patented May 23, 1916.
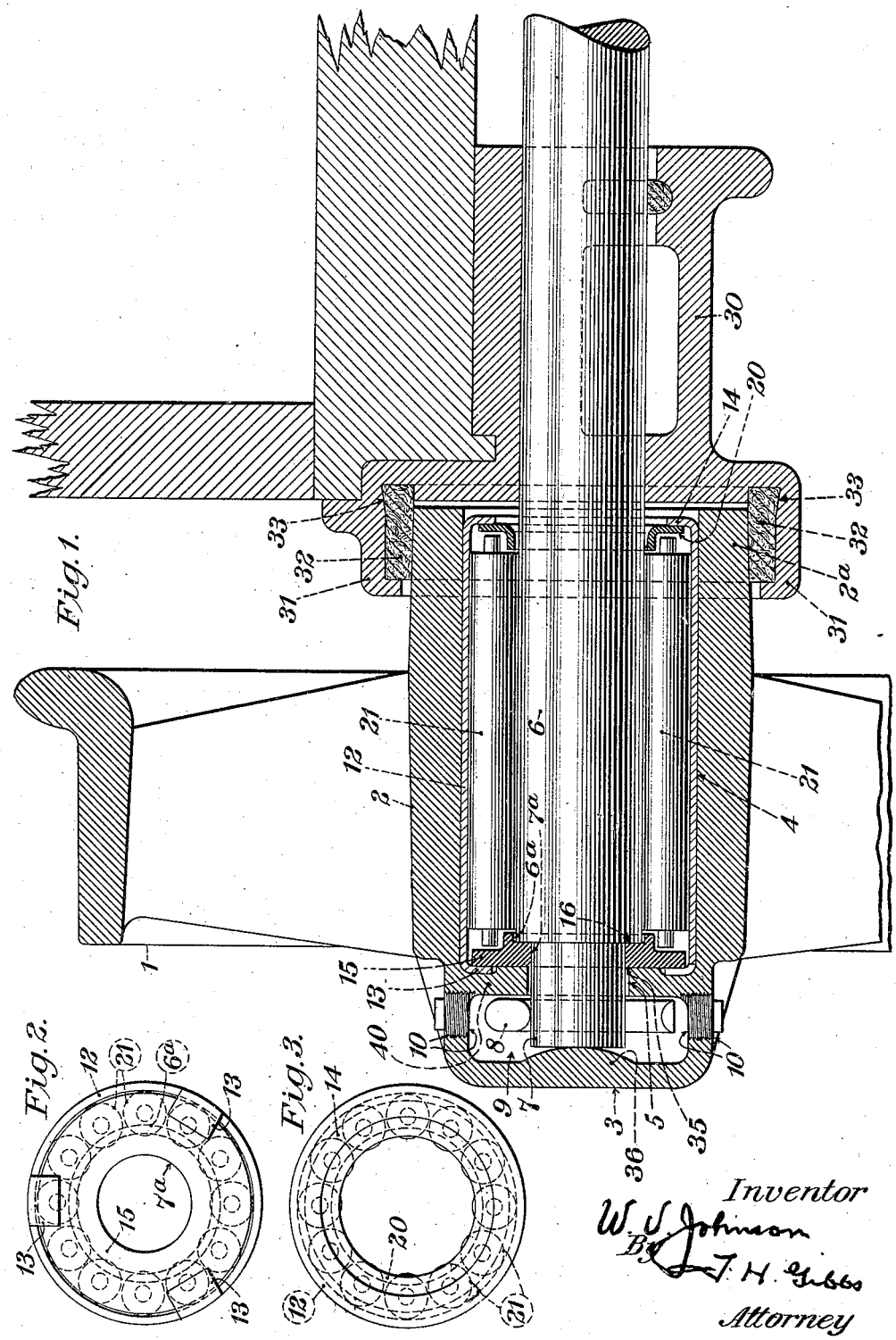
Inventor
W. V. Johnson
By J. H. Gibbs
Attorney

UNITED STATES PATENT OFFICE.

WARREN V. JOHNSON, OF BLOOMSBURG, PENNSYLVANIA, ASSIGNOR TO AMERICAN CAR AND FOUNDRY COMPANY, OF ST. LOUIS, MISSOURI, A CORPORATION OF NEW JERSEY.

MINE-CAR WHEEL.

1,183,984.     Specification of Letters Patent.     Patented May 23, 1916.

Application filed November 22, 1915. Serial No. 62,877.

*To all whom it may concern:*

Be it known that I, WARREN V. JOHNSON, residing at Bloomsburg, Pennsylvania, and being a citizen of the United States, have invented certain new and useful Improvements in Mine-Car Wheels, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a vertical transverse section through my improved wheel, its associated journal-bearing and an adjacent portion of the car and discloses the improved roller-bearing assembly in place in the wheel. Fig. 2 is an elevational view of that end of the roller-bearing assembly adjacent the reduced portion of the axle; and Fig. 3 is an elevational view of the other end of the roller-bearing assembly.

This invention relates to new and useful improvement in mine cars and comprises certain features of novelty in the detail formation and assembly thereof, as will be hereinafter pointed out.

One of the objects of the invention is to provide a roller bearing for a car or other vehicle, which is of the self-contained type and which may be placed in the wheel in an assembled condition and removed for disassembly or repairs at the will of the operator and which, in the preferred form, provides also a bearing for an end portion of an axle extended within the wheel, the wheel hub being preferably of the closed end type and providing a bearing for the end of said axle.

Coöperating with the wheel there is shown a journal box of the general type commonly employed in mine cars, into which journal box the inner end of the wheel hub is projected, and surrounding the wheel hub there is provided a packing to prevent wasteful egress of lubricant.

The saving of lubricant is one of the features of the invention and this is provided for at the outer end portion of the axle by the employment of a bearing for the axle of two diameters, smaller near the outer end and larger within the roller bearing portion, so as to provide a shoulder over which lubricant must pass before it can be wasted from the wheel at the outer end of the hub.

Referring to the parts, 1 indicates the wheel provided with a hub-portion 2, having a closed end 3 with an enlarged bore 4 through the main body portion of the hub, and a counterbore 5 of less diameter within the outer hub portion.

Coöperating with the peculiar type of wheel and roller bearing disclosed in the present application, there is employed an axle which is provided with an enlarged portion 6 extending throughout the major portion of its length terminating in a reduced end portion 7 which is perforated for the passage therethrough of a linch pin 8, which linch pin is adapted to lock the wheel in position on the axle it being understood that the linch pin is of such length that it may rotate freely within the chamber 9 formed in the outer end of the wheel hub, and said linch pin may be inserted in position through alined openings 10 in the wheel hub leading to said chamber 9.

The roller bearing assembly is of peculiar formation and comprises the sleeve 12, which is provided at its ends with the flanges 13 and 14, one of which flanges may be continuous annularly and the other of which may be discontinuous to provide lugs at intervals which lugs may be straightened out into alinement with the body portion 12 of the sleeve, to permit removal of the bearing annulus 15 when desired. The bearing annulus 15 is provided with a central bore 7ª adapted to fit the end portion 7 of the axle and is provided with an annular pocket 6ª adapted to receive the end of the enlarged portion of said axle 6, there being a shoulder 16 formed in the bearing annulus 15, as shown in Fig. 1.

Lubricant may be supplied to the interior of the wheel hub in any desired manner, and as there are any number of examples in the art no claim is made to the method or means employed to supply such lubricant, but it is to be observed that due to the height of the shoulder 16, above the bottom of the enlarged bore 4 of the wheel, a considerable quantity of oil or other lubricant will remain in the wheel hub, and the pumping action which might result from the movement of the wheel in operation back and forth longitudinally of the axle will not eject lubricant from the interior of the wheel as it would if the end portion of the axle at 7 were of the same diameter as at 6.

Coöperating with the bearing annulus 15, but at the opposite end of the sleeve 12, there is provided a flanged annulus 20 which is held in position by flange 14 hereinbefore referred to, and rollers 21, comprising the bearing rollers, are supported by the portions 6ª and 20, when the wheel is removed from its axle. The roller bearing assembly may be assembled and then slipped into position within the wheel hub, after which the wheel may be placed upon the axle and locked in position by the linch pin 8.

To provide against loss of lubricant at the inner end of the wheel hub, the journal bearing 30 is provided within its flanged portion 31, with an annular packing 32, which is locked in position by being seated in the packing recess 33, and said packing 32 bears against the outer perimeter of the inner end of the wheel hub 2.

It has been the practice to provide some sort of a packing within the journal boxes employed in mine cars but heretofore such packing has been of little value due to the fact that the portion 2ª of the wheel hub is not a true circle concentric with the longitudinal axis of the axle. The resultant eccentricity is due to ordinary faults in casting the wheel hubs and to provide against such eccentricity the wheel hub, at least within the portion 2ª thereof which fits into the packing ring 32, is preferably trued so as to provide a relatively tight fit between the wheel hub portion indicated and said packing, thereby gaining the greatest efficiency in service.

Should it become necessary or desirable at any time to remove the roller bearing assembly from the wheel hub, this may be done after the wheel has been removed from the axle by merely pressing against the shoulder 35, which results from the central bore of the bearing annulus 15, being of less diameter than the counterbore 5 in the outer end of the wheel hub.

The roller bearing assembly is held in position within the wheel, while the wheel is held on the axle by a linch pin 8, by reason of the shoulder of the axle at 7ª bearing against the annulus 15, consequently the linch pin 8 must be withdrawn and the wheel removed from the axle before the roller bearing assembly can be removed from the wheel hub.

To prevent strain which might result from sudden movement of the wheel longitudinally of the axle, the inner face of the closed end 3 is preferably arched as shown at 36, thereby providing a bearing for the end of the axle admirably adapted to receive end thrusts due to service conditions.

The rollers, the sleeve and the means employed to hold the rollers in position in the sleeve are all removable as an assembled unit in the event of the wheel being broken or worn out and are capable of use in other wheels than the one illustrated.

The chamber 9 and the chamber receiving the roller bearing assembly are separated by means of the wall 40 which is preferably cast integral with the hub of the wheel and disposed as shown intermediate the inner and outer ends of said hub, thereby providing a bearing for the outer end of the roller bearing assembly at one side, and for the linch pin which coöperates with the axle as before described to hold the wheel in position on such axle.

While in the preferred embodiment of the invention which is illustrated in the drawings, the end of the axle bears against the inner face of the hub cap as shown in Fig. 1, it is obvious that the hub cap may be differently proportioned and the shoulder at the end of the enlarged portion of the axle may bear against the member 15 and said member 15 in turn bear against the wall 40, thereby forming a stop which will prevent excessive movement of the wheel longitudinally of the axle, at the same time relieving the hub cap portion of such stresses as are incident to service conditions.

What I claim is:

1. In combination in a mine car, a car body, a journal box in coöperative relation therewith, an axle extended through said journal box, a wheel in part rotatable in said journal box, a fixed wall integral with the outer end portion of the hub of said wheel, a roller bearing in said hub and means extending through said axle locking said roller bearing in position.

2. In combination in a mine car wheel, a hub portion closed at one end there being a fixed wall integral with said hub intermediate its ends, an axle extending through one end of the hub past said wall and a roller bearing locked in position in said hub by means coöperating with said axle on one side of said wall.

3. In combination in a wheel, a cast metal hub having an integral perforated wall intermediate the ends of said hub, an axle projected through said wall, a roller bearing held in position by said axle on one side of the wall and locking means coöperating with the axle on the opposite side of said wall.

4. In combination in a wheel hub, a perforated wall intermediate the ends of said hub, a roller bearing removably positioned at one side of said wall, an axle projected through the wall, there being a shoulder on the axle adapted to bear against a relatively fixed portion of said roller bearing and means coöperating with the axle adapted to lock the wheel hub on the axle and thereby secure the roller bearing in position.

5. In a wheel, a hub portion provided with a roller bearing receiving portion, a closed hub cap integral with the hub and a perforated wall integral with the hub intermediate its ends the perforation in said wall being adapted to receive an axle and an axle of two diameters within said hub portion adapted to coöperate with the roller bearing therein.

6. In combination in a wheel, a hub cast as an integer and comprising a roller bearing chamber, a locking pin receiving chamber, a perforated wall separating said chambers and an axle extending through the perforation into both of said chambers and being provided with a shouldered portion adapted to hold a roller bearing assembly in position against longitudinal displacement.

7. In combination in a wheel assembly, a cast metal hub divided by a wall intermediate its ends into two chambers, a roller bearing assembly in one chamber, an axle bearing longitudinally against an element of said roller bearing assembly and extending through said wall and means in the other chamber coöperating with the axle to lock the wheel to the axle and to secure the roller bearing assembly within the wheel hub.

8. In combination in a mine car, a car body, a journal box in coöperative relation therewith, an axle extended through said journal box, a wheel having a hub portion cast as an integer including a portion rotatable in said journal box and being provided with an integral wall intermediate the ends of said hub, a roller bearing in said hub, a bearing annulus inserted in the hub in proximity to said wall and coöperating with the bearing rollers and means extending through said axle locking said roller bearing in position.

In witness whereof I have hereunto set my hand in the presence of two witnesses.

WARREN V. JOHNSON.

Witnesses:
  RALPH R. JOHN,
  MARGARET KELLY.